(12) United States Patent
Deng et al.

(10) Patent No.: US 11,915,137 B1
(45) Date of Patent: Feb. 27, 2024

(54) URBAN DATA PREDICTION METHOD BASED ON A GENERATIVE CAUSAL INTERPRETATION MODEL

(71) Applicants: Beihang University, Beijing (CN); Xicheng District Bureau of Science and Technology and Information Technology of Beijing Municipality, Beijing (CN)

(72) Inventors: Pan Deng, Beijing (CN); Yu Zhao, Beijing (CN); Jie Yan, Beijing (CN); Junting Liu, Beijing (CN); Mulan Wang, Beijing (CN)

(73) Assignees: BEIHANG UNIVERSITY, Beijing (CN); XICHENG DISTRICT BUREAU OF SCIENCE AND TECHNOLOGY AND INFORMATION TECHNOLOGY OF BEIJING MUNICIPALITY, Beijing (CN)

( * ) Notice: Subject to any disclaimer, the term of this patent is extended or adjusted under 35 U.S.C. 154(b) by 0 days.

(21) Appl. No.: 18/241,271

(22) Filed: Sep. 1, 2023

(30) Foreign Application Priority Data

May 6, 2023 (CN) .......................... 202310497666.1

(51) Int. Cl.
*G06N 3/08* (2023.01)
*G06N 3/0455* (2023.01)

(52) U.S. Cl.
CPC ............. *G06N 3/08* (2013.01); *G06N 3/0455* (2023.01)

(58) Field of Classification Search
CPC ................................ G06N 3/08; G06N 3/0455
See application file for complete search history.

(56) References Cited

U.S. PATENT DOCUMENTS

| | | | |
|---|---|---|---|
| 11,579,939 B2 * | 2/2023 | Freeman | G06F 9/45558 |
| 2020/0117492 A1 * | 4/2020 | Natarajan | G06F 11/3457 |
| 2022/0172050 A1 * | 6/2022 | Dalli | G06N 3/08 |

FOREIGN PATENT DOCUMENTS

| | | |
|---|---|---|
| CN | 111797768 A | 10/2020 |
| CN | 114193229 A | 3/2022 |

OTHER PUBLICATIONS

Zhao Y, Deng P, Liu J, Jia X, Zhang J. Generative Causal Interpretation Model for Spatio-Temporal Representation Learning. InProceedings of the 29th ACM SIGKDD Conference on Knowledge Discovery and Data Mining Aug. 6, 2023 (pp. 3537-3548). (Year: 2023).*

(Continued)

*Primary Examiner* — Fayyaz Alam
(74) *Attorney, Agent, or Firm* — Bayramoglu Law Offices LLC

(57) ABSTRACT

An urban data prediction method based on a generative causal interpretation model is provided. The generative causal interpretation model includes exogenous variables, spatio-temporal conditional parent variables, controlled causal transition functions, and spatio-temporal mixing functions. By inferring the model's exogenous variables, causal descriptors, spatio-temporal conditional parent variables, and other causal latent variables from the observation data and fitting the corresponding functions such as the controlled causal transfer function and the spatio-temporal mixing function, the invention can predict the spatio-temporal data in city level based on the model. The observation data of the urban complex system can be decomposed into causal descriptors with physical meanings. Under the influence of stable causal structure, the robustness and applica- (Continued)

bility of the model can be improved, so that the prediction results are more in line with the operation of urban complex systems.

6 Claims, 2 Drawing Sheets

(56) References Cited

OTHER PUBLICATIONS

Zeng Chunyan, et al., Survey of Interpretability Research on Deep Learning Models, Computer Engineering and Applications, 2021, pp. 1-9, vol. 57, No. 8.

Feng Wei, et al., Research on Forecasting Model Based on BP Neural Network for Urban Electricity Consumption, Power System and Clean Energy, 2018, pp. 19-25, 32, vol. 34, No. 6.

Gašper Beguš, et al., Interpreting Intermediate Convolutional Layers of Generative CNNs Trained on Waveforms, IEEE/ACM Transactions on Audio, Speech, and Language Processing, 2022, pp. 3214-3229, vol. 30.

* cited by examiner

URBAN DATA PREDICTION METHOD BASED ON A GENERATIVE CAUSAL INTERPRETATION MODEL

CROSS REFERENCE TO THE RELATED APPLICATIONS

This application is based upon and claims priority to Chinese Patent Application No. 202310497666.1, filed on May 6, 2023, the entire contents of which are incorporated herein by reference.

TECHNICAL FIELD

The invention belongs to the field of urban data prediction or optimization technology, which involves the mining and prediction of spatio-temporal data in urban complex systems. Specifically, it is an urban data prediction method based on a generative causal interpretation model.

BACKGROUND

The complex system generally refers to nonlinear and complex systems, the nonlinear and complex system refers to a system with high order, multi-loop, and nonlinear information feedback structure. There are many complex systems in nature, such as organisms, ecosystems, animals, and plants themselves and the environment on which they depend.

The feedback loops in nonlinear and complex systems form a structure of mutual connection and mutual restriction. Its feedback loop describes the relationship between key variables and other variables around them. Its decision leads to action, which changes the state around the system and generates new information—the basis for future new decisions, so the cycle forms a feedback loop.

For complex systems, exploring implicit evolutionary dynamics from observable spatio-temporal data is an important means to understand, predict and control complex systems in nature. It is widely used in many important fields such as power, traffic spatio-temporal sequence prediction, abnormal data detection, video analysis, and so on.

For example, electric power spatio-temporal data at the city level is a form of an urban complex system, which reflects the evolution law and dynamic process of the consumption phenomenon of urban electric power. The complex system at the city level can be represented as a complex graph network, in which the spatial nodes are represented as a region in the city, the node attributes are represented as the observable time series of the region evolving over time, and the connections between nodes represent the interaction or interaction between regions. The observable phenomena of the complex systems at the macro level emerge from the interaction between meso-regions. In order to explore and predict the dynamic process within the urban complex system, most methods learn the implicit graph network structure between regions at the meso level or establish a complex attention mechanism within the region to capture the long-term spatio-temporal correlation. However, the spatio-temporal data at the meso level is based on the observation results of the correlation between regions under the influence of a variety of factors, which are easily disturbed by the external environment and the noise of the system, thus concealing the characteristics of the region itself. Due to the limitations of the meso level, most of the methods stagnate in the study of explicit correlation between regions, while ignoring the implicit causality that affects the principle of regional observation generation, which is not conducive to the promotion and application of real scenes.

In contrast, causality is considered to be the basic axiom that characterizes the generation rules of observational phenomena. In the context of machine learning, correctly modeling and inferring causal variables and causal mechanisms can induce more robust feature representations, which helps to explain the generation principle of observational data. Therefore, it is a great solution to use the generative causal interpretation model to model the urban complex system and then use it to predict the urban electric power spatio-temporal data. The invention defines this causal latent variable as a causal descriptor in each region at the micro level, which dominates the development trend, evolutionary behavior, and physical state of complex systems. The observable data at the meso-regional level is a representation generated by the microscopic causal descriptor within the region through complex and nonlinear spatio-temporal mixing. By modeling and inferring the microscopic causal descriptors and their causal mechanisms in the region, it is helpful to explain the observation data and phenomena of the system.

The existing causal discovery methods focus too much on the causal relationship with the internal nodes while ignoring the causal interaction between nodes. The dynamic process of the urban complex system comes not only from the causal relationship within a single region but also from the dynamic interaction of causal descriptors among regions, which makes the causal descriptors have a complex and nonlinear spatio-temporal transfer process. However, it is impossible to analyze the impact factors generated by the data only through the regional correlation at the meso level, so it is difficult to decompose the mixed observation data into meaningful physical variables in the form of causal descriptors. In addition, as an exogenous variable of the system, regional attributes may change dynamically with time, which also leads to non-stationary spatio-temporal observation sequences.

SUMMARY

Aiming at the problems of existing technologies, the invention provides an urban data prediction method based on a generative causal interpretation model. Based on the idea of representation learning, the invention explores the latent causal structure and causal mechanism of microscopic causal descriptors in the spatio-temporal dimension, thereby revealing the generation principle of observation data of urban complex systems. Therefore, the invention proposes a Generative Causal Interpretation Model (GCIM) to model the observation generation process of urban complex systems. The model consists of four parts: exogenous variables, spatio-temporal conditional parent variables, controlled causal transition functions, and spatio-temporal mixing functions. The causal descriptors in each region of the urban complex system are highly complex in the spatial dimension, and the dynamic evolution process is non-stationary under the influence of exogenous variables. Therefore, it is very challenging to infer the latent causal structure and causal mechanism from the observation data. The invention proposes a learning framework based on the generative causal interpretation model GCIM. The purpose is to infer the causal latent variables (exogenous variables, causal descriptors, spatio-temporal conditional parent variables) of the model from the observation data and fit the corresponding functions (controlled causal transition function, spatio-temporal mixing function), and predict spatio-temporal data in city level based on the estimation model. The core idea of this learning framework is that the interaction (causal structure) and transfer process (causal mechanism) between causal descriptors on the spatial and temporal dimensions are globally stable, and the modeling is identifiable under appropriate conditions.

The complete technical solution of the invention includes the following:

An urban data prediction method based on a generative causal interpretation model is proposed, the generative causal interpretation model includes exogenous variables, spatio-temporal conditional parent variables, controlled causal transition functions, and spatio-temporal mixing functions, the exogenous variables are determined by an external state, the spatio-temporal mixing function is used to determine the causal descriptors from the observed urban data, the causal descriptors are the causal latent variables that use a neural network to generate a learning process of the causal interpretation model, the spatio-temporal conditional parent variables are a set of variables that are directly connected to the causal descriptors in the learnable causality graph, the controlled causal transition functions are used to determine the causal propagation modes of the causal descriptors; the urban data prediction method includes the following steps:

(1) collecting spatio-temporal data of data prediction region in a city, quantifying the data, and obtaining the time-division data set of each region;

(2) using an encoder in a variational autoencoder-decoder to fit the data sets of each region in step (1) to obtain a spatio-temporal mixing function and determine the causal descriptors, it specifically includes:

$$r_t = \sigma(W_r \star_G (x_t \| z_{t-1}) + b_r)$$

$$v_t = \sigma(W_v \star_G (x_t \| z_{t-1}) + b_v)$$

$$\tilde{h}_t = \phi(W_h \star_G (x_t \| (r_t \odot z_{t-1})) + b_h)$$

$$z_t = v_t \odot z_{t-1} + (1 - v_t) \odot \tilde{h}_t$$

Where $r_t$, $v_t$, $\tilde{h}_t$ are intermediate variables, $\|$ denotes a feature splicing operation, $\sigma$ is a function of sigmoid, $\phi(\cdot)$ denotes a hyperbolic tangent function, $x_t \in \mathbb{R}^{N \times D}$ is an observation data of each region at time t, $W_r, W_v, W_h, b_r, b_v, b_h$ are all graph convolution parameters, $z_t$ is a causal descriptor at the current time t output by GraphGRU, $z_{t-1}$ is a causal descriptor at time t−1, $\star_G$ denotes a graph convolution operation.

Through the above method, a posterior distribution $q(\hat{z}_t | x_t)$ of the causal descriptor is inferred from the observation data $x_t$ of each region at time t by the encoder in the coding stage, and $\hat{z}_t$ is a set of estimated causal descriptors, the posterior distribution is an isotropic Gaussian distribution, and the encoder outputs a mean and a variance of the Gaussian distribution.

(3) using a domain adapter to determine a domain information set from the time-division data set of each region in step (1), and determining the distribution of exogenous variables based on the domain information set, its specific method includes:

$$\hat{u} = \text{softmax}((\text{MLP}(x_{t-P+1:t}) + \gamma)/\tau) \in \mathbb{R}^{N \times R}$$

where $\hat{u}$ is an estimated domain information set when the input is the observation data of a time window P, softmax is a Gumbel Softmax algorithm.

MLP is a multi-layer perceptron, $\tau$ is a temperature variable, $\gamma$ is a random noise sampled independently from Gumbel(0,1) distribution, and $x_{t-1+1:t} \in \mathbb{R}^{N \times P \times D}$ denotes the observation data within the time window P.

Based on domain information, a distribution $p(\hat{\epsilon}_t | \hat{u})$ of exogenous variables is obtained as follows:

$$p(\hat{\epsilon}_t | \hat{u}) = \Pi_{i,k} p(\hat{\epsilon}_{i,t}^k | \hat{u}_i^r)$$

$$p(\hat{\epsilon}_{i,t}^k | \hat{u}_i^r) = \mathcal{N}(\mu(\hat{u}_i^r), \sigma(\hat{u}_i^r))$$

where $\mathcal{N}$ denotes a Gaussian distribution, $\mu$ and $\sigma$ denote a mean and a variance of the Gaussian distribution obtained by MLP, $\hat{\epsilon}ee_t$ denotes a set of exogenous variables estimated at time t, and each element $\hat{\epsilon}_{i,t}^k$ is sampled from the Gaussian distribution formed by the estimated domain information, $\hat{u}$ is an estimated domain information set when the input is the observation data of a time window P, $\hat{\epsilon}_{i,t}^k$ is an element in $\hat{\epsilon}_t$, it denotes the k th estimated exogenous variable of the i th region at time t, and $\hat{u}_i^r$ is an element in $\hat{u}$, it denotes that a domain information category of the i th region is r.

(4) using the multi-layer perceptron to transform the spatio-temporal conditional parent variables into conditional parameters of the controlled causal transition functions, it specifically includes:

$$Pa(z_{i,t}^k) = \{z_{i,t-1} \odot \mathcal{G}_{intra}^k, z_{U(i),t-1} \odot \mathcal{G}_{intra(t)}^k\} \in \mathbb{R}^{K+K|U(i)|}$$

$$\theta_{i,t}^k = \text{Conditioner}_k(Pa(z_{i,t}^k))$$

$Pa(z_{i,t}^k)$ denotes a spatio-temporal conditional parent variable with direct causal effect on a causal descriptor $z_{i,t}^k$, $\odot$ is a Hadamard product, $z_{i,t-1} = \{z_{i,t-1}^k\} \in \mathbb{R}^K$ denotes a set of causal descriptors within the region i at time t−1, $\mathcal{G}_{intra}^k \in \{0,1\}^K$ denotes an intra-region causality graph of the k th causal descriptor at the previous moment in the same region; U(i) is a set of local neighborhoods of the domain i determined by an adjacency relation, $z_{U(i),t-1} = \{z_{j \in U(i),t-1}^k\} \in \mathbb{R}^{K|U(i)|}$ denotes all sets of causal descriptors in the local neighborhood of the domain i at time t−1, $\mathcal{G}_{inter(i)}^k \in \{0,1\}^{K|U(i)|}$ denotes an intra-region causality of the k th causal descriptor at the previous moment in region i;

$\theta_{i,t}^k$ is a conditional parameter of the controlled causal transition functions; $\text{Conditioner}_k(\cdot)$ is a parameter-independent multi-layer perceptron function in a feature dimension.

Using an invertible neural spline flow network to fit the controlled causal transformation function $f_k$ to complete the construction of the causal interpretation model.

(5) according to the generative causal interpretation model constructed in step (4), generating conditional parameters of the controlled causal transition function by using the exogenous variables at the next moment in the current region according to the spatio-temporal conditional parent variables of the causal descriptors at the previous moment, and mapping the exogenous variables to the causal descriptors at the next moment in the current region; mixing the causal descriptors are nonlinear to generate the spatio-temporal data of the current region at the next moment by using the decoder in the variational autoencoder decoder, and completing the prediction of urban data.

Furthermore, the urban data is electric power data, and the electric power data includes time, region, and power consumption.

Furthermore, the urban data is solar energy data, and the solar energy data includes solar power generation in time, region, and unit time.

Furthermore, in step (2), the spatio-temporal mixing function is an arbitrary nonlinear but invertible function.

Furthermore, the spatio-temporal mixing function is invertible and differentiable everywhere, and the controlled causal transition function is invertible and quadratically differentiable.

Furthermore, the change in the distribution of exogenous variables is controlled by the set of domain information, after the set of domain information is given, the exogenous variables are independent of each other.

The advantages of the invention relative to the existing technology are as follows:

(1) Different from the modeling method for traditional urban complex systems that focuses on the meso-regional level, this invention proposes a mathematical model for generating causal interpretation from the perspective of the principle of spatio-temporal data generation to model the spatio-temporal causal structure and causal mechanism of the micro-level causal descriptor and simulate the generation process of spatio-temporal data. Compared with traditional correlation research, the observation data of urban complex systems can be decomposed into causal descriptors with physical meaning. Under the influence of stable causal structure, the robustness and applicability of the model can be improved, so that the prediction results are more in line with the operation of urban complex systems.

(2) Under the constraint of the identifiable condition of the model, a GCIM learning framework of generative causal interpretation model based on variational inference is proposed to ensure that the model can accurately infer the causal descriptors from the observation data, the interpretability of the model is further improved, thus the overall generalization ability is improved.

(3) The invention proposes to use the domain adapter to automatically mine the domain information of the current region from the observation data, and focuses on modeling the causal relationship within and between regions in the complex system, which helps to capture the temporal and spatial causal relationship, restore the spatiotemporal dynamics of the urban complex system to the greatest extent, and greatly improve the accuracy of prediction.

(4) Experiments on real data sets show that the generative causal interpretation model GCIM successfully identifies potential spatio-temporal causal structures and mechanisms, and predicts future data effectively, which proves the importance of modeling spatio-temporal data from micro causality.

DETAILED DESCRIPTION OF THE EMBODIMENTS

Figure 1:
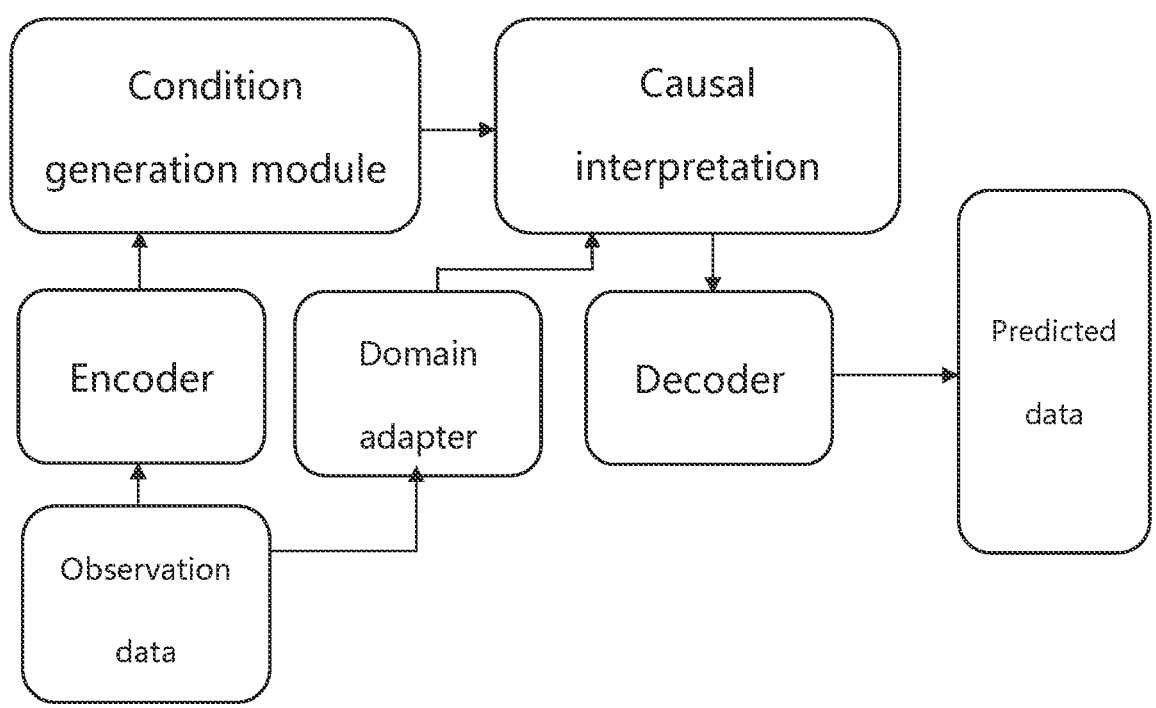
FIG. 1 is a schematic diagram of the learning framework of the causal interpretation model GCIM generated by the invention.

The technical solution of the invention is further described in detail in combination with the attached diagram of the invention in the following. Obviously, the embodiment described is only used as an example, it doesn't have any limitation to the application.

The invention provides an urban data prediction method based on a generative causal interpretation model, which understands the generation principle of observation data in urban complex systems from the micro causal descriptor level, and learns the mathematical model from historical observation data to predict future spatio-temporal data. The method of the invention includes the following steps:

Step 1: First, proposing a generative causal interpretation model (GCIM) by this invention, and analyzing the observation generation process of urban complex systems through mathematical modeling, the model includes exogenous variables, spatio-temporal conditional parent variables, controlled causal transition functions, and spatio-temporal mixing functions, the specific form is as follows:

$$x_t = g(z_t)$$

$$z_{i,t}^k = f_k(\epsilon_{i,t}^k; \theta_{i,t}^k)$$

$$\theta_{i,t}^k = \text{Conditioner}_k(Pa(z_{i,t}^k))$$

$$\epsilon_{i,t}^k \sim p(\epsilon_i^k | u_i^r) \qquad (1)$$

where $x_t \in \mathbb{R}^{N \times D}$ denotes observation data of each region at time t, N denotes a number of regions in the complex system, and D denotes a dimension of the observation data; g is a spatio-temporal mixing function.

$z_t \in \mathbb{R}^{N \times K}$ denotes a causal descriptor set of each region at time t, and K denotes a number of causal descriptors in the region.

$z_{i,t}^k$ is an element of the causal descriptor set $z_t$ of each region at time t; $z_{i,t}^k$ denotes the k th causal descriptor at time t in the i th region.

$f_k$ is a controlled causal transition function, $\epsilon_{i,t}^k$ denotes an exogenous variable corresponding to the causal descriptor $z_{i,t}^k$, and $\theta_{i,t}^k$ is a conditional parameter of the controlled causal transition function; $\text{Condioner}_k$ is a parameter-independent multi-layer perceptron function in a feature dimension.

$Pa(z_{i,t}^k)$ denotes a spatio-temporal conditional parent variable that has a direct causal effect on the causal descriptor $z_{i,t}^k$.

$u \in \mathbb{R}^{N \times R}$ denotes a set of domain information, R denotes a number of domains; where the element $u_i^r$ of u denotes that the i th region belongs to the r th domain, and $p(\epsilon_i^k | u_i^r)$ denotes a distribution of the k th exogenous variable $\epsilon_i^k$ in the i th region under the influence of domain information $u_i^r$;

the exogenous variable $\epsilon_{i,t}^k$ is determined by an external state of the complex system, and the non-stationarity of the exogenous variables is usually caused by domains, $\epsilon_{i,t}^k$ denotes the k th exogenous variable at time t in the i th region. The distribution of exogenous variables is consistent in each domain, but it is different in different domains. Therefore, under the condition of a given domain information $u_i^r$, exogenous variables $\epsilon_{i,t}^k$ are independent.

An exogenous variable is an inherent attribute that characterizes a physical concept (such as regional attributes and weather conditions), so it has a direct impact on the causal descriptors. The non-stationarity of exogenous variables also directly leads to the non-stationarity of the distribution of causal descriptors.

The spatio-temporal conditional parent variable $Pa(z_{i,t}^k)$ describes the causal structure in the time and space dimensions respectively and clarifies the causal propagation path, it is defined as follows:

$$Pa(z_{i,t}^k) = \{z_{i,t-1} \odot \mathcal{G}_{intra}^k, z_{U(i), t-1} \odot \mathcal{G}_{inter(i)}^k\} \in \mathbb{R}^{K+K|U(i)|} \qquad (2)$$

where $\odot$ is a Hadamard product, $z_{i,t-1} = \{z_{i,t-1}^k\} \in \mathbb{R}^K$ denotes a set of causal descriptors within the region i at time t−1, $\mathcal{G}_{intra}^k \in \{0,1\}^K$ denotes an intra-region causality graph of the k th causal descriptor at the previous moment in the same region.

U(i) is a set of local neighborhoods in the region i determined by the adjacency relationship, $z_{U(i),t-1} = \{z_{j \in I(i),t-1}^k\} \in \mathbb{R}^{K|U(i)|}$ denotes all the sets of causal descriptors in the local neighborhood of the region i at time t−1, $\mathcal{G}_{inter(i)}^k \in \{0,1\}^{K|U(i)|}$ denotes an intra-region causality of the k th causal descriptor at the previous moment in region i.

Due to the different causal effects brought by the local neighborhoods of different regions, there are N different inter-regional causality graphs. In a causal sufficient system, the causal descriptors are independent of each other under the condition of given spatio-temporal conditional parent variables. Therefore, we regard $Pa(z_{i,t}^k)$ as a conditional parameter of the controlled causal transition function $\theta_{i,t}^k$, which controls the specific form of the equation, where Conditioner$_k(\cdot)$ is a parameter-independent multi-layer perceptron function in a feature dimension.

The controlled causal transition function $f_k$ describes a causal propagation mechanism of the causal descriptors, which maps the exogenous variables to the causal descriptors with a physical meaning under the influence of a conditional parent variable. a conditional parameter $\theta_{i,t}^k$ is given, $f_k$ is globally shared and stable, and its implementation directly affects the identifiability of the causal descriptors.

The spatio-temporal mixing function g explains a process of generating observations by causal descriptors, its form is globally shared and stable, and can be any complex nonlinear but invertible function.

The urban electric power complex system specifically involved in this embodiment is used for explaining the above model in the following. Aiming at the problem that the regional attribute, as an exogenous variable of the system, may change dynamically with time, resulting in a non-stationary spatio-temporal observation sequence, the invention defines the regional attribute as a piece of domain information. For the spatio-temporal data prediction of the multi-regional electricity consumption, the causal descriptor is an unobservable hidden variable that affects regional electricity consumption. The invention uses deep learning technology to mine the hidden variable to model and explain the generation process of electricity consumption in urban complex systems. The causal descriptors of regional electricity consumption in urban complex systems may include but are not limited to the following situations (data that are difficult to collect, such as population density, building density, economic activity intensity, and traffic conditions). The purpose of this invention is to infer the causal descriptors that may affect the electricity consumption in the region from the observable electricity consumption data of each region in the city, to establish a causal relationship between the causal descriptors, and then to model and explain the generation law and causal mechanism of electricity consumption in each region in urban complex systems.

Population density: Population density is an important spatial feature, because regions with high population density often need more power supply to meet the requirements of the life and business activities of People. For example, electricity consumption in big cities is usually higher than that in rural regions, because cities have more people and business activities.

Building density: Building density is also an important spatial feature, because regions with high building density need more power supply to support the lighting, air conditioning, elevator, and other electricity in those buildings. For example, the electricity consumption of commercial regions is usually higher than that of residential regions, because the building density of commercial regions is higher.

3. Economic activity intensity: Economic activity intensity is also an important factor affecting electricity consumption. Developed regions often need more power supply to meet higher production and consumption needs. For example, a region with a higher degree of industrialization may have higher electricity consumption than a region with a higher degree of agriculturalization.

Traffic conditions: Traffic conditions may also affect electricity consumption, because traffic conditions affect the travel and logistics needs of people. For example, cities with poor traffic conditions may need more lighting and signal lights to ensure traffic safety and thus increase electricity consumption.

In addition, the variables such as regional attributes, weather conditions, and regional aggregation activities are used as unknown exogenous variables outside the system, and the time series model of the electricity consumption in each region is summarized as a piece of domain information. For example, the time series model of electricity consumption in each region has periodicity, trend, seasonality, and suddenness. When exogenous variables such as weather change, the time series model of electricity consumption in the region will also change, at the same time, sudden regional aggregation activities will also lead to dynamic changes in the regional electricity consumption model. The spatio-temporal transfer process of causal descriptors is also regulated by non-stationary exogenous variables.

Step 2: Establishing identifiable conditions for the generative causal interpretation model GCIM in step 1, as follows:

Definition 1 (observational equivalence): Let $\{x_t\}_{t=1}^T$ be an observable spatio-temporal sequence variable generated by a real potential spatio-temporal causal mechanism (g, $f$, θ, $p_{\epsilon|u}$), where g, $f$, θ, $p_{\epsilon|u}$ are defined in the formula, g is a spatio-temporal mixing function, $f$ is a set of controlled causal transition functions for all causal descriptors, θ is a set of conditional parameters generated by the spatio-temporal conditional parent variable, and $p_{\epsilon|u}$ is a distribution of exogenous variables under the influence of domain.

An estimation model $(\hat{g}, \hat{f}, \hat{\theta}, \hat{p}_{\epsilon|u})$ can be learned from the observation data, $\hat{g}$ denotes a spatio-temporal mixing function estimated from the observation data, $\hat{f}$ denotes a set of controlled causal transition functions estimated from the observation data, $\hat{\theta}$ denotes a set of conditional parameters estimated from the observation data, and $\hat{p}_{\epsilon|u}$ denotes a distribution of exogenous variables estimated from the observation data.

If the data distribution $p_{\hat{g},\hat{f},\hat{\theta},\hat{p}_{\epsilon|u}}(\{x_t\}_{t=1}^T)$ obtained by the estimation model matches the real data distribution $p_{g,f,\theta,p_{\epsilon|u}}(\{x_t\}_{t=1}^T)$, then it is said that the real potential spatio-temporal causal mechanism ($\hat{g}$, $\hat{f}$, $\hat{\theta}$, $\hat{p}_{\epsilon|u}$) of the estimated model (g, $f$, θ, $p_{\epsilon|u}$) can be learned from the observation data.

Definition 2 (component-by-component identifiability): Based on the observation equivalence, the real spatio-temporal mixing function g and the spatio-temporal mixing function $\hat{g}$ estimated from the observation data can be mutually transformed by a permutation operation π and a component-by-component invertible transformation T, the formal description is as follows:

$$p_{\hat{g},\hat{f},\hat{\theta},\hat{p}_{\epsilon|u}}(\{x_t\}_{t=1}^T) = p_{g,f,\theta,p_{\epsilon|u}}(\{x_t\}_{t=1}^T) \Rightarrow \hat{g} = g \circ \pi \circ T \qquad (3)$$

Then the real potential spatio-temporal causal mechanism is called to be component-by-component identifiable, that is, the causal descriptors described by the model (g, $f$, θ, $p_{\epsilon|u}$) can be learned from the observation data so that the real causal descriptor set $z_t$ and the estimated causal descriptor set $\hat{z}_t$ can be mutually transformed by the permutation operation R and the component-by-component invertible transformation T.

In addition, if the causal descriptors estimated from the observation data can reach a degree of the component-by-component identifiability, the potential spatio-temporal causal structure is also identifiable, because in the urban complex system with a sufficient causal system, the conditional independence of causal descriptors can fully characterize the spatio-temporal causal structure within the system, and the permutation operation and the component-by-component invertible operation will not destroy the conditional independence between the causal descriptors.

Under the guarantee of Definition 1 and Definition 2, the invention proposes a condition that makes the generative causal interpretation model GCIM identifiable, the specific theorem is as follows:

Theorem 1 (Identifiability condition of a generative causal interpretation model GCIM): If the learning framework of the generative causal interpretation model GCIM satisfies the following conditions:
(1) The spatio-temporal mixing function g is invertible and differentiable everywhere, and at the same time, the controlled causal transition function $f_k$ is invertible and quadratically differentiable.
(2) The change of exogenous variable distribution $p_{\epsilon|u}$ is controlled by a domain information set u, the domain information set u is given, and the exogenous variables are independent of each other.
(3) For any causal descriptor set $z_{i,t} \in \mathbb{R}^K$, $\forall i=\{1, \ldots, N\}$ of the i th region, there is 2K+1 different domain information $u_i=\{u_i^r\}_{r=0}^{2K}$, which makes the causal descriptor $z_{i,t}$ in the same region have great differences under the influence of different domain information $u_i$.

The generative causal interpretation model GCIM is called identifiable, which can learn the real potential spatio-temporal causal mechanism and spatio-temporal causal structure from the observation data.

Step 3: A generative causal interpretation model GCIM learning framework based on variational inference is built under the condition of identifiability constraints, so as to learn the estimation model from the observation data and infer the causal descriptors.

FIG. 1 shows a learning framework of the causal interpretation model generated by the invention, as shown in FIG. 1, a generative causal interpretation model (as shown in Formula 1) and the corresponding identifiable conditions (as shown in Theorem 1) are given, the invention proposes a learning framework based on variational inference. In the model learning phase, the identifiable conditions are used as the constraints of the learning framework to estimate the potential spatio-temporal causal structure and mechanism from the observation data. As shown in FIG. 1, the estimation framework of GCIM consists of four components: a variational autoencoder, a domain adapter, a Condition Generation Module (CGM), and a Causal Interpretation Module (CIM).

Each component is introduced in the following, firstly, the invention establishes a variational autoencoder structure to ensure the reversibility of the spatio-temporal mixing function and satisfy condition (1), the encoder infers the causal descriptors from the observation data, and the decoder performs nonlinear mixing on the causal descriptors to generate the spatio-temporal data of the region. Secondly, in order to model the non-stationarity under the influence of exogenous variables and satisfy the conditions (2) and (3), the invention proposes a domain adapter, which allocates the observation data within a certain period to the corresponding domain, the distribution of exogenous variables in the same domain is consistent, and the distribution of exogenous variables between different domains is different; and then, in order to capture the spatio-temporal causal structure, the invention proposes a Condition Generation Module (CGM), which captures the causal relationship within and between regions by using the adjacency relationship between regions as an inductive bias, the condition generation module generates the spatio-temporal conditional parent variables and converts the spatio-temporal conditional parent variables into the conditional parameter of the causal transition function to control the causal transition function; finally, in order to satisfy the reversibility of the controlled causal transition function $f_k$ and satisfy condition (1), the invention proposes a Causal Interpretation Module (CIM), which realizes the causal transition function by using an invertible neural spline flow network, and maps the exogenous variables to the causal descriptors with physical meaning under the influence of the conditional parameters. In the application stage: firstly, the exogenous variables at the current time of the current region are sampled from the distribution of exogenous variables: secondly, the conditional generation module CGM is used to generate the conditional parameters of the controlled causal transition function according to the spatio-temporal conditional parent variables of the causal descriptors at the previous moment; then, the exogenous variables are mapped to the causal descriptor at the current time of the current region under the influence of the conditional parameters by using the causal interpretation module CIM again, finally, the decoder in the variational autoencoder is used to nonlinearly mix the causal descriptors to generate the spatio-temporal data at the current moment of the current region.

The specific steps include:

Step (1): According to the spatio-temporal causality within the urban complex system, the generation process of observation data is defined from the micro-causal descriptor level, and the mathematical principle of the causal interpretation model GCIM is established. At the same time, the multi-modal data of the research region are collected, the data are quantified, the urban multi-modal data are constructed, and the time-division data of each region are obtained as the input of the GCIM learning framework for generating the causal interpretation model.

Step (2): Using the neural network, the learning framework of the generative interpretation model GCIM is built, and the identifiability condition is used as the constraint condition of the neural network, the main purpose is to infer the causal descriptors from the observation data of the current system and estimate the potential spatio-temporal causal structure and spatio-temporal causal mechanism, this step includes the following steps (2.1)-step (2.5).

Step (2.1), in order to meet the reversibility of the spatio-temporal mixing function in Condition (1), the Variational Auto Encoder (VAE) framework is used to model the inference process of the causal descriptors and the generation process of the observation data. GraphGRU is used as an encoder and a decoder to handle both spatial and temporal dimensions, it is defined as follows:

$$r_t = \sigma(W_r \star_G (x_t \| z_{t-1}) + b_r)$$

$$v_t = \sigma(W_v \star_G (x_t \| z_{t-1}) + b_v)$$

$$\tilde{h}_t = \phi(W_h \star_G (x_t \| (r_t \odot z_{t-1})) + b_h)$$

$$z_t = v_t \odot z_{t-1} + (1 - v_t) \odot \tilde{h}_t \quad (4)$$

where $r_t$, $v_t$, $\tilde{h}_t$ are intermediate variables, $\|$ denotes a feature splicing operation, $\sigma$ is a function of sigmoid, $\phi(\cdot)$ denotes a hyperbolic tangent function, $x_t \in \mathbb{R}^{N \times D}$ is an observation data of each region at time t, $W_r, W_z, W_h, b_r, b_z, b_h$ are all graph convolution parameters, $z_t$ is a causal descriptor at the current time t output by GraphGRU, $z_{t-1}$ is a causal descriptor at time t−1, $\star_G$ denotes a graph convolution operation, the specific definition as follows.

$$W \star_G (X) + b = (I + C^{-1/2} G C^{-1/2}) XW + b \qquad (5)$$

Where $G \in \mathbb{R}^{N \times N}$ denotes a predefined adjacency relationship between regions, $C_{ij} = \Sigma_j G_{ij}$, N is the number of regions in a complex system.

W and b are graph convolution parameters, X is a graph convolution input, and I is a unit matrix.

The predefined adjacency relationship is defined as follows:

$$G_{ij} = \begin{cases} \exp\left(-\dfrac{dis_{ij}^2}{\sigma^2}\right) & dis_{ij} > \varepsilon^{geo} \\ 0 & \text{otherwise} \end{cases} \qquad (6)$$

where $dis_{ij}$, $1 \leq i, j \leq N$ is a distance between region $r_i$ and region $r_j$, according to the latitude and longitude calculation of the regional center, $\varepsilon^{geo}$ denotes the distance threshold, which is set to 2 km according to the actual situation, and $\sigma^2$ is the variance of the distance matrix, which is used to control the distribution and sparsity of the matrix.

The purpose of the encoding stage is to fit the spatio-temporal mixing function g, the invention infers a posterior distribution $q(\hat{z}_t | x_t)$ of the causal descriptors from the observation data $x_t$ by using the encoder, the posterior distribution is an isotropic Gaussian distribution, and the encoder outputs the mean and variance of the Gaussian distribution. The purpose of the decoding stage is to approximate the inverse function $g^{-1}$ of the spatio-temporal mixing function. The invention samples the estimated causal descriptor $\hat{z}_t$ from the posterior distribution $q(\hat{z}_t | x_t)$ in a reparameterized manner, and the decoder is used to generate the reconstructed data $\hat{x}_t$ of each node from the estimated causal descriptor $\hat{z}_t$.

Step (2.2), in most cases, although the observation data show non-stationarity due to the influence of the domain, the domain information is usually unknown. In order to satisfy the constraints of conditions (2) and (3), the invention proposes a domain adapter to capture potential domain information from the observation data and uses the Gumbel Softmax method to ensure that the observation of each node belongs to only one domain. The definition is as follows:

$$\hat{u} = \text{softmax}((\text{MLP}(x_{t-P+1:t}) + \gamma)/\tau) \in \mathbb{R}^{N \times R} \qquad (7)$$

where $\hat{u}$ is an estimated domain information set when the input is the observation data of the time window P, MLP is a multi-layer perceptron, $\tau$ is a temperature variable, $\gamma$ is a random noise sampled independently from Gumbel(0,1) distribution, and $x_{t-P+1:t} \in \mathbb{R}^{N \times P \times D}$ denotes the observation data within the time window P.

According to hypothesis (3), if the number of causal descriptors is K, the number of domains needs to be $R \geq 2K+1$. Based on the domain information, we can define a distribution of exogenous variables, and further decompose the distribution of exogenous variables $p(\hat{\epsilon}_t | \hat{u})$ defined in step 1 according to conditional independence.

$$p(\hat{\epsilon}_t | \hat{u}) = \Pi_{i,k} p(\hat{\epsilon}_{i,t}^k | \hat{u}_i^r)$$

$$p(\hat{\epsilon}_{i,t}^k | \hat{u}_i^r) = \mathcal{N}(\mu(\hat{u}_i^r), \sigma(\hat{u}_i^r)) \qquad (8)$$

where, $\hat{\epsilon}_t$ is a set of exogenous variables estimated at time t, $\hat{u}$ is a set of estimated domain information when the input is the observation data of the time window P, $\hat{\epsilon}_{i,t}^k$ is an element in $\hat{\epsilon}_t$, it denotes the k th estimated exogenous variable of the i th region at time t, and $\hat{u}_i^r$ is an element in $\hat{u}$, it denotes that a domain information category of the i th region is r, $\mu$ and $\sigma$ denote a mean and a variance of the Gaussian distribution obtained by MLP, $\mathcal{N}$ denotes a Gaussian distribution.

Step (2.3), in order to capture the spatio-temporal causal structure sufficiently, we propose a conditional generation module (CGM), we decompose the spatio-temporal causal structure into intra-regional causal relationship $\mathcal{G}_{intra} \in \{0, 1\}^{K \times K}$ and inter-regional causal relationship $\mathcal{G}_{inter(i)} \in \{0, 1\}^{K \times K|U(i)|}$, and use a learnable parameter matrix to model the two relationships. $\mathcal{G}_{intra}^{k,l} = 1$ and $\mathcal{G}_{j \in inter(i)}^{k,l} = 1$ denote a causal edge from $z_{i,t-1}^l$ to $z_{i,t}^k$ and a causal edge from $z_{j,t-1}^l$ to $z_{i,t}^k$ respectively. As an inductive deviation of causality between nodes, the adjacency relationship U(i) can compress the parameter matrix $\mathcal{G}_{inter(i)}$ from $\mathcal{O}(NK^2)$ to $\mathcal{O}(|U(i)|K^2)$. $\mathcal{O}$ denotes a space complexity, which greatly reduces the learning parameters and improves the identifiability.

According to the conditional independence of the causal descriptors, the invention transforms the parent variables obtained by the spatio-temporal causal structure into the conditional parameter $\theta_{i,t}^k$ of the causal transition function through $\text{Conditioner}_k(\cdot)$, $\text{Conditioner}_k(\cdot)$ is a parameter-independent multi-layer perceptron function in the feature dimension:

$$Pa(z_{i,t}^k) = \{z_{ij-1} \odot \mathcal{G}_{intra}^k, z_{U(i)t-1} \odot \mathcal{G}_{inter(i)}^k\}$$
$$\in \mathbb{R}^{K + K|U(i)|}$$

$$\theta_{i,t}^k = \text{Conditioner}_k(Pa(z_{i,t}^k)) \qquad (9)$$

Step (2.4), previous VAE-based time series representation learning methods use standard multivariate Gaussian before regularizing the posterior of latent variables, which greatly limits the expression ability of the model. Therefore, the invention proposes a causal interpretation module, the purpose of which is to model the prior distribution $p(\hat{z}_t | Pa(\hat{z}_t), \hat{u})$ of the causal descriptors based on the causal transformation function $f_k$. In addition, the invention injects condition (2) and condition (3) into the prior rules generated by the causal descriptors and uses an invertible neural spline flow network to fit $f_k$, $f_k^{-1}$ is expressed as the inverse function of $f_k$.

First, the prior distribution is transformed into an exogenous variable distribution using the variable theorem, the definition is as follows:

$$\log p(Pa(\hat{z}_t), \hat{z}_t | \hat{u}) = \log p(Pa(\hat{z}_t), \hat{\epsilon}_t | \hat{u}) + \log |\det(J_{f^{-1}})| \qquad (10)$$

$$J_{f^{-1}} = \begin{pmatrix} \mathbb{I}_{NK} & 0 \\ * & \text{diag}\left(\dfrac{\partial f_k^{-1}}{\partial \hat{z}_{i,t}^k}\right) \end{pmatrix}$$

where the exogenous variable $\hat{\epsilon}_{i,t}^k$ and the spatio-temporal condition parent variable $Pa(\hat{z}_{i,t}^k)$ are independent of each other, and $\hat{z}_{i,t}^k$ and $\hat{\epsilon}_{i,t}^k$ are a one-to-one relationship, which makes the Jacobian a triangular matrix, the above formula can be further derived into the following form:

$$\log p(\hat{z}_t|Pa(\hat{z}_t), \hat{u}) = \log p(\hat{\epsilon}_t|\hat{u}) + \log|\det(J_{f^{-1}})| \quad (11)$$

$$= \sum_i^N \sum_k^K \log p(\hat{\epsilon}_{i,t}^k|\hat{u}_i^r) + \sum_i^N \sum_k^K \log\left|\frac{\partial f_k^{-1}}{\partial \hat{z}_{i,t}^k}\right|$$

CIM explains the internal causal mechanism of causal descriptors and uses a learnable prior distribution to approximate the real latent causal mechanism within a complex system, thereby standardizing the posterior distribution of causal descriptors and improving the identifiability of the model.

Step (2.5), predicting the future state of the system based on the estimated causal descriptor is an important function of generating the model. The invention assumes that the domain information does not change in a short time, so the exogenous variables of the current region at the next moment can be sampled from the distribution of exogenous variables, secondly, the conditional generation module CGM is used to generate the conditional parameters of the controlled causal transition function according to the spatio-temporal conditional parent variables of the causal descriptors at the previous moment, then, using the causal interpretation module CIM, the exogenous variables are mapped to the causal descriptors of the next moment in the current region under the influence of the conditional parameters. Finally, using the decoder in the variational autoencoder, the causal descriptors are nonlinearly mixed to generate the spatio-temporal data of the current region at the next moment. The formal definition is as follows:

$$\hat{\epsilon}_{i,t+1}^k \cdot p(\hat{\epsilon}_i^k|\hat{u}_i^r) \hat{z}_{i,t+1}^k = f_k(\hat{\epsilon}_{i,t+1}^k; \hat{\theta}_{i,t+1}^k) \hat{x}_{t+1} = \mathcal{G}(\hat{z}_{t+1}) \quad (12)$$

Reconstruction process: Since the posterior part takes the current observation data as input, therefore, the causal descriptors are sampled from the posterior distribution $q(\hat{z}_t|x_t)$, and the output result is a reconstruction structure when the decoder is used to generate spatio-temporal data.

Prediction process: The prior distribution $p(\hat{z}_t|Pa(\hat{z}_t),\hat{u})$ is only controlled by spatio-temporal conditional parent variables via domain information, and the observation data at the current time is not involved. Therefore, the exogenous variables are sampled from the distribution of exogenous variables, and the spatio-temporal data generated according to Formula 11 is used to output the prediction results.

Step (3): an urban complex system data set is given, the invention uses the Evidence Lower Bound (ELBO) and the prediction loss function to learn to generate a causal interpretation model, and then uses the trained generated causal interpretation model to predict the data of each sub-region in the research region. The causal descriptors are sampled from the posterior distribution, and the logarithmic probabilities of the causal descriptors in the posterior distribution and the prior distribution are calculated respectively, and the expected value is calculated between the difference of the above two values.

In addition, we use Mean-Squared Error (MSE) as the prediction loss to obtain the final loss function.

Step 4: The historical data in the research scenario are collected to train the GCIM learning framework of the generative causal interpretation model, and the trained model is deployed on the urban system, the future power consumption of each region is predicted according to the historical power consumption of each sub-region in the research region, the urban electric power system can plan and manage the resources of power generation, transmission and distribution according to the actual situation, so as to optimize the operation efficiency and reliability of the power system.

Embodiment 1

We evaluate the identifiability and predictive performance of GCIM on a real-world public spatio-temporal dataset, Electricity Load Diagrams 2011-2014 (Electricity), which is The data is an open source shared in the UCI machine learning library [https://archive.ics.uci.edu/ml/datasets/ElectricityLoadDiagrams20112014].

The dataset records the electricity consumption of 370 regions in Portugal from 2011 to 2014, with a sampling period of 15 minutes. For the stability of the time series, the invention deletes the region with missing values, only retains the electricity consumption of each region from 2021 to 2014, and divides the data set at an interval of 1 hour to obtain 26,304 samples and 321 regions of the Electriurban dataset. The invention uses historical data of 1 hour to predict the data in the next 30 minutes. 60% of the data is used for training, 20% for verification, and the rest for testing.

The invention uses root mean square error (RMSE), mean absolute error (MAE), and mean absolute percentage error (MAPE) methods to evaluate the performance of the model. The invention compares the causal interpretation model with the current advanced spatio-temporal representation learning methods to verify the predictive performance of the causal interpretation model. The final average results are shown in Table 1.

TABLE 1

Quantitative analysis results of the proposed method and other methods on the Electriurban dataset

| Dataset | Metric form | AGCRN | DGCNR | DMSTGCN | GCLM |
|---|---|---|---|---|---|
| Electri-city | MAE | 193.6714 | 181.9508 | 182.9211 | 174.3120 |
| | RMSF | 1599.8140 | 1321.1903 | 1258.9708 | 1203.3312 |
| | MAPE (%) | 13.8222 | 14.0817 | 14.8676 | 12.2909 |

Figure 2:
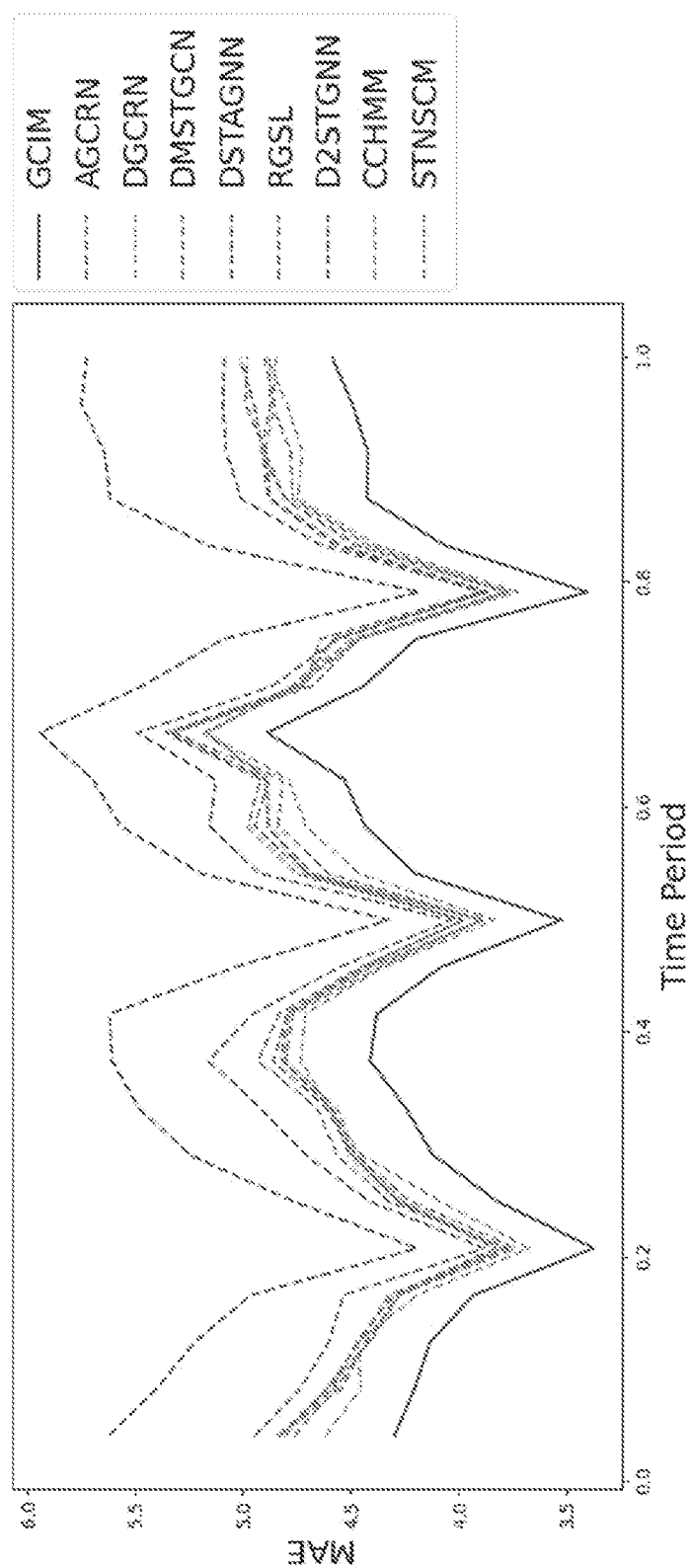
FIG. 2 is a comparison diagram of the test results of the proposed method and the baseline method on an urban electric power data set.

Table 1 shows an overall prediction performance, for spatio-temporal observation sequence data, when the observation dimension is higher, the causal relationship in the system is more complex, and MAPE can effectively reflect the ability of the model to resist random fluctuations. Therefore, the GCIM of the invention is always superior to the baseline model. A method for mining based on implicit graphs. AGCRN only uses adaptive adjacency graphs so it is resulted in poor performance, which indicates that it is necessary to use predefined adjacency relations as prior knowledge. DMSTGCN and RGSL embed the spatio-temporal correlation in the training data into the implicit graphs and fuse the explicit graphs to predict the observation results, these two methods have a similar performance. DGCRN uses input data to dynamically generate implicit graphs, which can capture dynamic spatio-temporal correlation in a better way. It indicates that capturing dynamic spatio-temporal correlation is beneficial to prediction. FIG. 2 shows an evolution trend of the MAE of the GCIM model and the test set baseline of the invention. Thanks to the precise modeling of causal relationships within the system, the GCIM model performs best in each period, reflecting its stability.

Embodiment 2

We evaluate the identifiability and predictive performance of GCIM on a real-world public spatio-temporal dataset, ESolar Power Data (Solar-Energy), which is The data is an open source shared in the UCI machine learning library [https://www.nrel.gov/grid/solar-power-data.html].

The dataset records the solar power generation of 137 power stations in the United States in 2006, with a sampling period of 10 minutes. The invention also divides the data set at an interval of 10 minutes to obtain 52560 samples and 137 regions of the Solar-Energy data set. The invention uses historical data of 1 hour to predict the data in the next 30 minutes. 60% of the data is used for training, 20% for verification, and the rest for testing.

The invention uses root mean square error (RMSE), mean absolute error (MAE), and mean absolute percentage error (MAPE) methods to evaluate model performance. The causal interpretation model is compared with the state-of-the-art spatio-temporal representation learning methods to verify the predictive performance of the causal interpretation model. The final average results are shown in Table 2.

TABLE 2

Quantitative analysis results of the proposed method and other methods on the Solar-Energy dataset

| Data set | Metric form | AGCRN | DGCNR | DMSTGCN | GCLM |
|---|---|---|---|---|---|
| Solar | MAE | 0.3882 | 0.4042 | 0.3969 | 0.3789 |
| Power | RVSE | 0.9755 | 0.9912 | 0.9845 | 0.9553 |

Table 2 shows an overall prediction performance, for spatio-temporal observation sequence data, when the observation dimension is higher, the causal relationship within the system is more complex. Therefore, the GCIM of the invention is always superior to the baseline model. A method for mining based on implicit graphs. AGCRN only uses adaptive adjacency graphs so it is resulted in poor performance, which indicates that it is necessary to use predefined adjacency relations as prior knowledge. DMSTGCN embeds the spatio-temporal correlation in the training data into the implicit graphs and fuses the explicit graphs to predict the observation results, which have similar performance. DGCRN uses input data to dynamically generate implicit graphs, which can better capture dynamic spatio-temporal correlation. This shows that capturing dynamic spatio-temporal correlation is beneficial to prediction. FIG. 2 shows the evolution trend of the MAE of the GCIM model and the test set baseline of the invention. Thanks to the precise modeling of causal relationships within the system, the GCIM model performs best in each period, reflecting its stability.

The above embodiments are only some implementation methods of this application. For ordinary technicians in this field, some variants and improvements can also be made on the premise of not deviating from the creative idea of this invention, and those variants and improvements belong to the protection scope of this invention.

What is claimed is:

1. An urban data prediction method based on a generative causal interpretation model, wherein the generative causal interpretation model comprises an exogenous variable, a spatio-temporal conditional parent variable, a controlled causal transition function, and a spatio-temporal mixing function, the exogenous variable is determined by an external state, the spatio-temporal mixing function is configured to determine a causal descriptor from observed urban data, the causal descriptor is a causal latent variable using a neural network to generate a learning process of the generative causal interpretation model, the spatio-temporal conditional parent variable is a set of variables directly connected to the causal descriptor in a learnable causality graph, the controlled causal transition function is configured to determine a causal propagation mode of the causal descriptor; the urban data prediction method comprises the following steps:

(1) collecting spatio-temporal data of a data prediction region in a city, quantifying the spatio-temporal data to obtain a time-division data set of each region;

(2) using an encoder in a variational autoencoder-decoder to fit the time-division data set of the each region in step (1) to obtain the spatio-temporal mixing function and determine the causal descriptor;

(3) using a domain adapter to determine a domain information set from the time-division data set of the each region in step (1), and determining a distribution of the exogenous variable based on the domain information set;

(4) using a multi-layer perceptron to transform the spatio-temporal conditional parent variable into a conditional parameter of the controlled causal transition function, using an invertible neural spline flow network to fit a controlled causal transformation function to complete a construction of the generative causal interpretation model; specifically comprising:

$$Pa(z_{i,t}^k) = \{z_{i,t-1} \odot \mathcal{G}_{intra}^k, z_{U(i),t-1} \odot \mathcal{G}_{inter(i)}^k\} \in \mathbb{R}^{K+K|U(i)|}$$

$$\theta_{i,t}^k = \text{Conditioner}_k(Pa(z_{i,t}^k))$$

$Pa(z_{i,t}^k)$ denotes the spatio-temporal conditional parent variable with a direct causal effect on the causal descriptor $z_{i,t}^k$, $\odot$ is a Hadamard product, $z_{i,t-1} = \{z_{i,t-1}^k\} \in \mathbb{R}^K$ denotes a set of causal descriptors within a region i at a time t−1, $\mathcal{G}_{intra}^k \in \{0,1\}^K$ denotes an intra-region causality graph of a k th causal descriptor at a previous moment in a same region; U(i) s a set of local neighborhoods of a domain i determined by an adjacency relation, $z_{U(i),t-1} = \{z_{j \in U(i),t-1}^k\} \in \mathbb{R}^{K|U(i)|}$ denotes all sets of causal descriptors in the set of local neighborhoods of the domain i at the time t−1, $\mathcal{G}_{inter(i)}^k \in \{0,1\}^{K|U(i)|}$ denotes an inter-region causality of the k th causal descriptor at the previous moment in the region i;

$\theta_{i,t}^k$ is the conditional parameter of the controlled causal transition function; $\text{Conditioner}_k(\bullet)$ is a parameter-independent multi-layer perceptron function in a feature dimension; using the invertible neural spline flow network to fit the controlled causal transformation function $f_k$ to complete the construction of the generative causal interpretation model, (5) according to the generative causal interpretation model constructed in step (4), generating the conditional parameter of the controlled causal transition function by using the exogenous variable at a next moment in a current region according to the spatio-temporal conditional parent variable of the causal descriptor at the previous moment, and mapping the exogenous variable to the causal descriptor at the next moment in the current region; mixing the causal descriptor nonlinearly to generate the spatio-temporal data of the current region at the next moment by using a decoder in the variational autoencoder-decoder to complete a prediction of urban data.

2. The urban data prediction method based on the generative causal interpretation model according to claim 1, wherein the urban data is electric power data, and the electric power data comprises a first time, a first region, and a power consumption.

3. The urban data prediction method based on the generative causal interpretation model according to claim 2, wherein the urban data is solar energy data, and the solar energy data comprises a solar power generation in a unit time, a second region, and a second time.

4. The urban data prediction method based on the generative causal interpretation model according to claim 3, wherein in step (2), the spatio-temporal mixing function is an arbitrary nonlinear but invertible function.

5. The urban data prediction method based on the generative causal interpretation model according to claim 4, wherein the spatio-temporal mixing function is invertible and differentiable everywhere, and the controlled causal transition function is invertible and quadratically differentiable.

6. The urban data prediction method based on the generative causal interpretation model according to claim 5, wherein a change of the distribution of the exogenous variable is controlled by the domain information set, after the domain information set is given, the exogenous variable is independent of each other.

\* \* \* \* \*